US012618461B2

(12) United States Patent
Lee

(10) Patent No.: US 12,618,461 B2
(45) Date of Patent: May 5, 2026

(54) ACTUATOR AND METHOD OF MANUFACTURING THE SAME

(71) Applicant: HL MANDO CORPORATION, Gyeonggi-do (KR)

(72) Inventor: Jaehyun Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/637,353

(22) Filed: Apr. 16, 2024

(65) Prior Publication Data

US 2025/0012351 A1 Jan. 9, 2025

(30) Foreign Application Priority Data

Jul. 6, 2023 (KR) ......................... 10-2023-0087930

(51) Int. Cl.
F16H 57/039 (2012.01)
B60T 13/74 (2006.01)
(Continued)

(52) U.S. Cl.
CPC .......... F16H 57/039 (2013.01); B60T 13/746 (2013.01); F16D 65/18 (2013.01); F16H 19/08 (2013.01); F16H 55/06 (2013.01); F16H 57/0025 (2013.01); F16H 57/021 (2013.01); F16H 57/023 (2013.01); (Continued)

(58) Field of Classification Search
CPC ........ F16D 2121/24; F16H 1/16; F16H 1/166; F16H 57/039; F16H 57/021; F16H 2057/0213
See application file for complete search history.

(56) References Cited

U.S. PATENT DOCUMENTS 6,742,409 B2 * 6/2004 Blanchard ............. F16H 57/021
74/416
12,025,197 B2 * 7/2024 Choi ..................... F16D 65/183

FOREIGN PATENT DOCUMENTS

JP 2019140849 A * 8/2019
KR 10-2017-0108640 9/2017
(Continued)

OTHER PUBLICATIONS

JP-2019140849-A Machine Translation (Year: 2019).*
(Continued)

*Primary Examiner* — Jake Cook
(74) *Attorney, Agent, or Firm* — WOMBLE BOND DICKINSON (US) LLP

(57) ABSTRACT

An actuator may include a motor generating a rotational force, a gear assembly transmitting the rotational force of the motor, and a housing accommodating the gear assembly therein. The gear assembly includes a driving gear provided on a driving shaft of the motor, a first gear unit connected with the driving gear, and a second gear unit connected with the first gear unit to transmit the rotational force transmitted from the first gear unit to a power conversion unit, and the first gear unit includes a gear shaft, a first driven gear provided on one side of the gear shaft and meshed with the driving gear, a second driven gear provided on the other side of the gear shaft and meshed with the second gear unit, and a bearing provided on the gear shaft between the first driven gear and the second driven gear.

19 Claims, 13 Drawing Sheets

(51) Int. Cl.

| | |
|---|---|
| *F16D 65/18* | (2006.01) |
| *F16D 121/24* | (2012.01) |
| *F16D 125/52* | (2012.01) |
| *F16H 19/08* | (2006.01) |
| *F16H 55/06* | (2006.01) |
| *F16H 57/00* | (2012.01) |
| *F16H 57/02* | (2012.01) |
| *F16H 57/021* | (2012.01) |
| *F16H 57/023* | (2012.01) |
| *F16H 57/025* | (2012.01) |

(52) U.S. Cl.
CPC ....... *F16H 57/025* (2013.01); *F16D 2121/24* (2013.01); *F16D 2125/52* (2013.01); *F16H 2055/065* (2013.01); *F16H 2057/02034* (2013.01); *F16H 2057/02082* (2013.01); *F16H 2057/0213* (2013.01)

(56) References Cited

FOREIGN PATENT DOCUMENTS

| KR | 10-2018-0096294 | 8/2018 |
|---|---|---|
| KR | 10-2022-0108468 | 8/2022 |
| KR | 10-2443769 | 9/2022 |
| KR | 10-2023-0026133 | 2/2023 |

OTHER PUBLICATIONS

Office Action (1st) dated Mar. 17, 2025 for Korean Patent Application No. 10-2023-0087930 and its English translation provided by Applicant's foreign counsel.

Office Action dated Sep. 22, 2025 for Korean Patent Application No. 10-2023-0087930 and Its English translation provided by Applicant's foreign counsel.

* cited by examiner

ACTUATOR AND METHOD OF MANUFACTURING THE SAME

CROSS-REFERENCE TO RELATED APPLICATION

This application claims the priority to and the benefit of Korean Patent Application No. 10-2023-0087930, filed on Jul. 6, 2023 in the Korean Intellectual Property Office, the disclosure of which is incorporated herein by reference in its entirety.

BACKGROUND

1. Field

Some embodiments of the present disclosure generally relate to an actuator and a method of manufacturing the same, and more specifically, to an actuator for a brake system, of which a shape and a structure are simplified to improve applicability and assemblability to a vehicle, and a method of manufacturing the same.

2. Description of the Related Art

Brake systems are necessarily mounted in vehicles to perform braking, and various types of brake systems have been developed for the safety of drivers and passengers.

The conventional brake system uses a mechanically connected booster when a driver presses a brake pedal in order to supply a hydraulic pressure necessary for braking to a wheel cylinder. However, for a driver's convenience, an electromechanical braking system receives a driver's braking intention using an electrical signal and operates a power transmission device such as a motor to brake a vehicle based on the electrical signal.

Such an electromechanical brake system receives power from an actuator including a motor and a reducer to provide a clamping pressure of a brake disc and perform service braking or parking braking of a vehicle.

Meanwhile, the actuator which provides the power for braking may be mounted to a caliper housing provided on a side of each wheel. Typically, the actuator includes a plurality of gear elements, and an internal structure and an external shape are asymmetrical shapes in many cases. Accordingly, when the actuator is installed on each wheel, since mounting directions of a left wheel and a right wheel are different, there may be problems that the actuator interferes with components therearound and mountability and applicability to a vehicle are degraded.

When the actuator of the left wheel and the actuator of the right wheel are designed or manufactured differently or separately in order to solve these problems, there are problems that a production efficiency of the product decreases, and a manufacturing cost increases. In addition, as the conventional actuator has the asymmetrical shape, a direction of a thrust applied to the gear elements may change, a wear portion may be changed according to a position of the wheel on which the actuator is mounted, and thus the durability of the product may be degraded.

SUMMARY

Therefore, it is one aspect of the present disclosure to provide an actuator of which mountability and applicability to a vehicle are improved, and a method of manufacturing the same.

It is another aspect of the present disclosure to provide an actuator that improves space utilization of a vehicle body, and a method of manufacturing the same.

It is still another aspect of the present disclosure to provide an actuator that improves the durability and performance of a product, and a method of manufacturing the same.

It is yet another aspect of the present disclosure to provide an actuator which stably generates and provides braking power regardless of a position of a wheel which is mounted to a vehicle, and a method of manufacturing the same.

It is yet another aspect of the present disclosure to provide an actuator that simplifies a structure and a shape of a product to improve assemblability and productivity, and a method of manufacturing the same.

It is yet another aspect of the present disclosure to provide an actuator of which a design is simplified and a manufacturing cost is reduced, and a method of manufacturing the same.

In accordance with one aspect of the present disclosure, an actuator includes a motor configured to provide a driving force, a gear assembly configured to transmit the driving force of the motor, and a housing in which the gear assembly is accommodated, wherein the gear assembly includes a driving gear provided on a driving shaft of the motor, a first gear unit connected to the driving gear to transmit a rotational force, and a second gear unit connected to the first gear unit to transmit the rotational force transmitted from the first gear unit to a power conversion unit, and the first gear unit includes a gear shaft, a first driven gear provided on one side of the gear shaft and meshed with the driving gear, a second driven gear provided on the other side of the gear shaft and meshed with the second gear unit, and a bearing provided between the first driven gear and the second driven gear on the gear shaft.

The housing may include a bearing accommodation part provided to surround one end portion and the other end portion of the bearing.

The housing may include at least one pair of mounting parts protruding from an outer surface of the housing and mounted on a supportable structure using a fastening member, and the pair of mounting parts may be provided symmetrically with respect to a central line of the housing.

At least one protruding portion protruding outward due to the first gear unit accommodated in the housing may be provided on the housing, and an outer end of the protruding portion may be provided further inward than an outer end of each of the pair of mounting parts with respect to the central line of the housing.

An inner ring of the bearing may include a coupling hole formed to pass through the bearing in an axial direction of the gear shaft, and an inner circumferential surface of the coupling hole may be provided to be press-fitted onto an outer circumferential surface of the gear shaft.

The first gear unit may further include a clip member coupled to the outer circumferential surface of the gear shaft to support the bearing on the gear shaft.

The first driven gear may be provided as a helical gear, and the helical gear may be provided on the gear shaft through injection molding.

The first gear unit may further include a support ring injection-molded between the other end portion of the helical gear and one end portion of the bearing on an outer circumferential surface of the worm shaft to support the bearing.

The other end portion of the bearing may be supported by a latching step formed on the outer circumferential surface of the worm shaft.

The first driven gear may be provided as a helical gear, and the helical gear may be provided on one side of the gear shaft through riveting.

The second driven gear may be provided as a worm gear, and the worm gear may be integrally provided with the gear shaft.

The second gear unit may include a worm wheel meshed with the worm gear.

In accordance with another aspect of the present disclosure, an actuator includes a motor configured to provide a driving force, a gear assembly configured to transmit the driving force of the motor, and a housing in which the gear assembly is accommodated, wherein the housing includes at least one pair of mounting parts formed to protrude from an outer surface of the housing and mounted on supportable structure such as a vehicle body using fastening members and at least one protruding portion protruding outward due to the gear assembly accommodated in the housing, and an outer end of the protruding portion is provided further inward than an outer end of each of the pair of mounting parts with respect to a central line of the housing.

The pair of mounting parts may be provided symmetrically with respect to the central line of the housing.

In accordance with still another aspect of the present disclosure, a method of manufacturing an actuator includes providing a motor configured to provide a driving force, and providing a gear assembly configured to transmit the driving force of the motor to a housing, wherein the providing of the gear assembly includes providing a driving gear on the driving shaft of the motor, providing a helical gear meshed with the driving gear on one side of the worm shaft, providing a worm gear on the other side of the worm shaft, and providing a bearing on the worm shaft, and the providing of the bearing includes press-fitting the bearing onto an outer circumferential surface of a central portion between the helical gear and the worm gear on the worm shaft.

The providing of the helical gear may include injection-molding the helical gear on one side of the worm shaft after the bearing is press-fitted onto the worm shaft.

The providing of the bearing may further include providing a clip member on one side of the bearing on the worm shaft after the bearing is press-fitted onto the worm shaft.

When the helical gear is injection-molded, the helical gear may be injection-molded with a support ring between the other end portion of the helical gear and one end portion of the bearing on an outer circumferential surface of the worm shaft.

The providing of the helical gear may include fixedly riveting the separately manufactured helical gear to one side of the worm shaft after the bearing is press-fitted onto the worm shaft.

The providing of the worm gear may include integrally providing the worm shaft and the worm gear.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
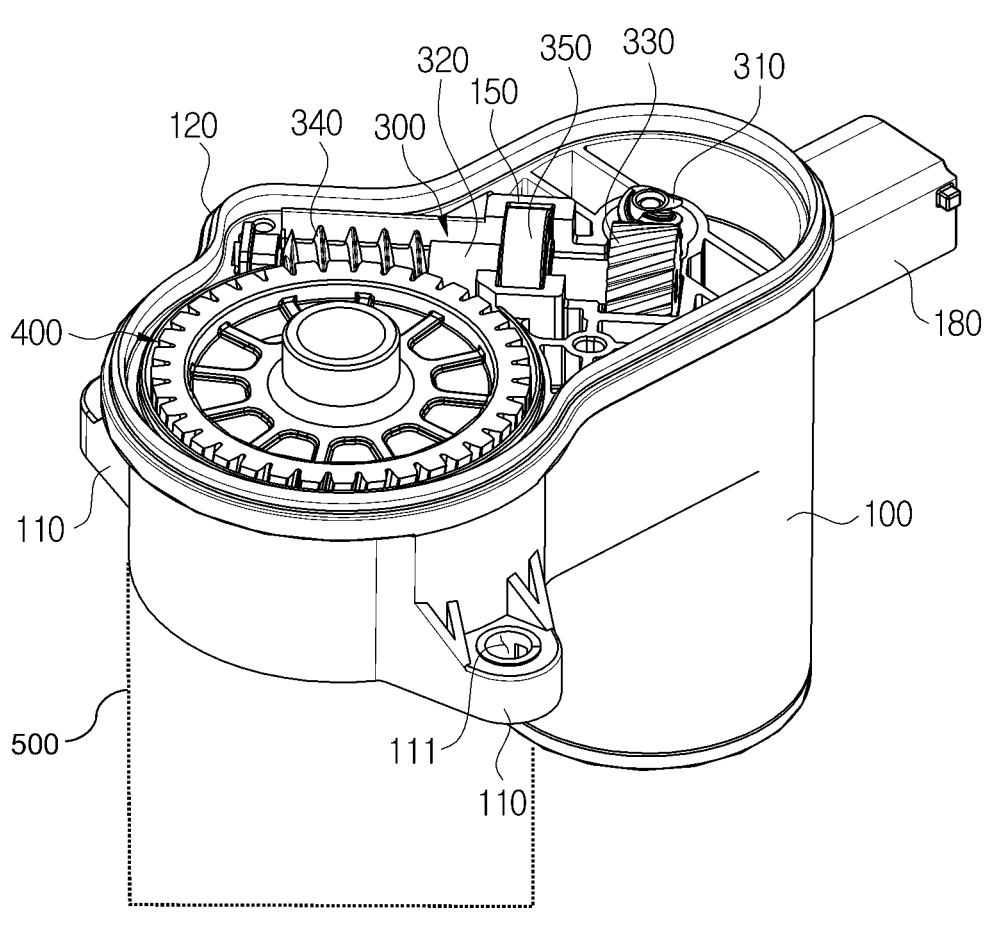
FIG. 1 is a perspective view illustrating an actuator according to an embodiment of the present disclosure.

Hereinafter, embodiments of the present disclosure will be described in detail with reference to the accompanying drawings. The following embodiments are examples to provide the spirit of the present disclosure to those skilled in the art. The present disclosure is not limited to the following embodiments and may also be implemented in different forms. In the drawings, portions which are not related to the description may be omitted for clarifying the present disclosure, and sizes of components may be slightly exaggerated for helping understanding of the present disclosure.

Figure 2:
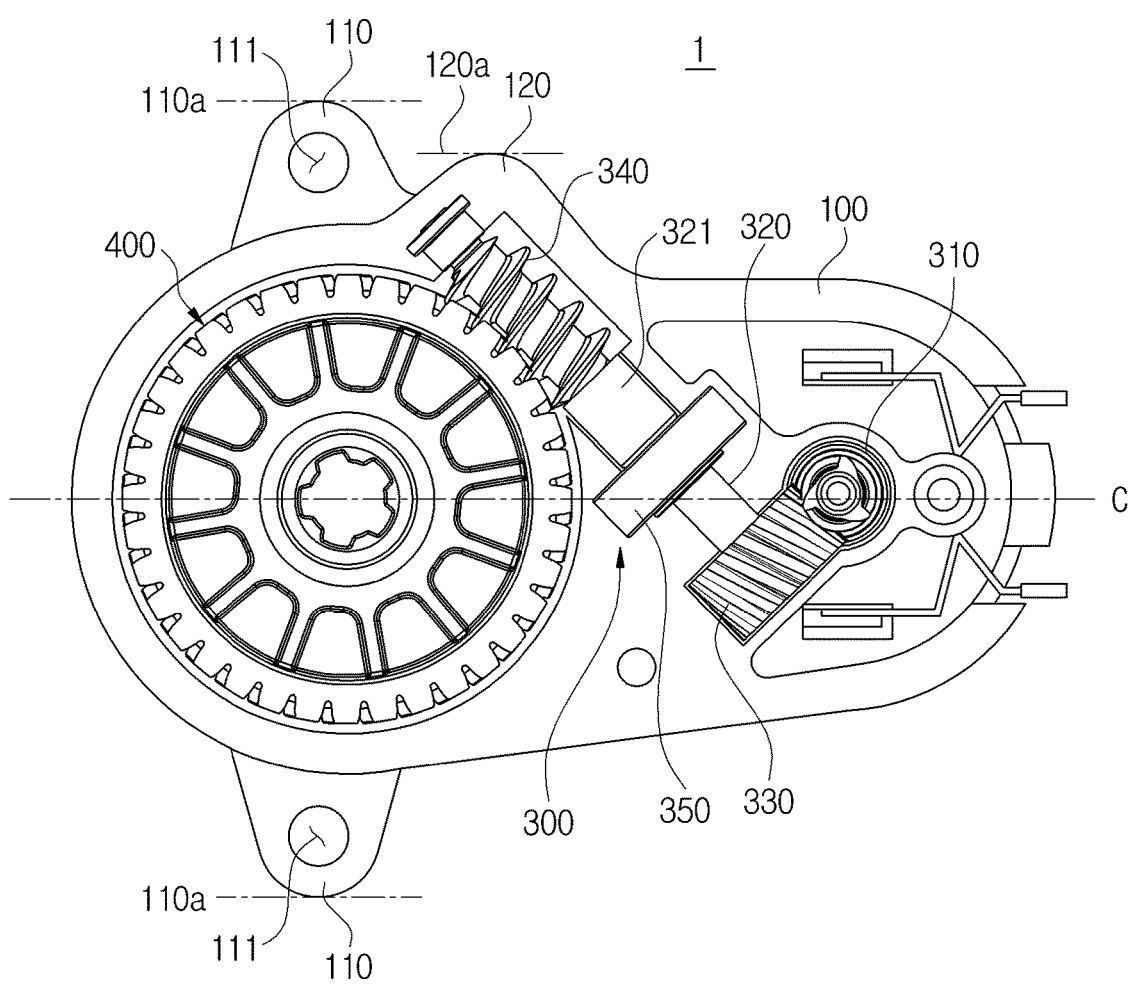
FIG. 2 is a plan view illustrating an actuator according to an embodiment of the present disclosure.

FIG. 1 is a perspective view illustrating an actuator 1 according to an embodiment of the present disclosure, and FIG. 2 is a plan view illustrating the actuator 1 according to an embodiment of the present disclosure. In addition, FIG. 3 is a partially exploded perspective view illustrating the actuator 1 according to an embodiment of the present disclosure.

Figure 3:
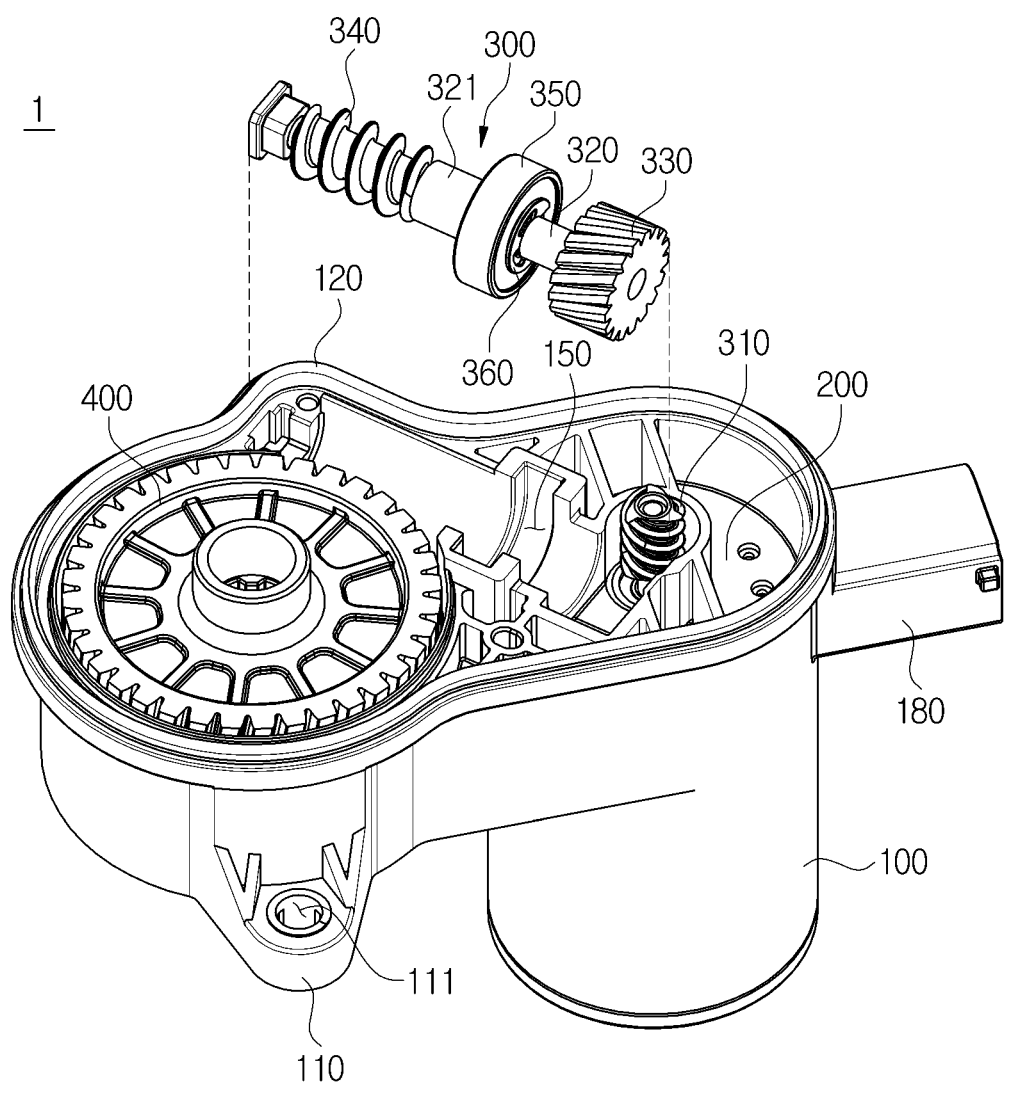
FIG. 3 is a partially exploded perspective view illustrating an actuator according to an embodiment of the present disclosure.

Referring to FIGS. 1 to 3, the actuator 1 according to an embodiment of the present disclosure includes a motor 200, a gear assembly, and a housing 100. The motor 200 provides power for braking of a vehicle. The gear assembly transmits a driving force of the motor 200 to a power conversion unit 500. The housing 100 accommodates and supports the motor 200 and the gear assembly therein.

The motor 200 may receive electric power from a power source such as a battery of the vehicle to operate and generate and provide power or force for braking of the vehicle. The motor 200 may be accommodated in and supported by an accommodation portion of the housing 100 for the motor 200, the accommodation portion may be formed to be recessed in one side of the housing 100, and the motor 200 may operate according to an electrical signal transmitted from an electronic control unit (ECU). A driving gear 310, which will be described below, may be coupled to a driving shaft of the motor 200, and this will be described in detail below.

The gear assembly may be configured to reduce rotational power or force provided from the motor 200 and transmit the rotational power or force to the power conversion unit 500. The gear assembly may include the driving gear 310, a first gear unit 300, and a second gear unit 400. The driving gear 310 may be provided on or fixedly mounted to the driving shaft of the motor 200. The first gear unit 300 may be rotatably connected with the driving gear 310 to transmit the rotational force, received from the driving gear 310, to the second gear unit 400. The second gear unit 400 is rotatably connected to the first gear unit 300 to transmits the rotational force, received from the first gear unit 300, to the power conversion unit 500.

The driving gear 310 may be fixedly coupled to the driving shaft of the motor 200 and may rotate together with the driving shaft of the motor 200 when the motor 200 operates or drives. The driving gear 310 may include, for example, but not limited to, a helical gear, and thus the rotational power or force provided by the motor 200 may be primarily reduced and then transmitted to the first gear unit 300 which will be described below.

The first gear unit 300 receives the rotational power or force transmitted from the driving gear 310 and transmits the rotational power or force to the second gear unit 400 which will be described below. The first gear unit 300 may include, for instance, but not limited to, a gear shaft 320, a first driven gear 330, a second driven gear 340, and a bearing 350. The first driven gear 330 may be provided on or fixedly mounted to one side of the gear shaft 320 and rotatably meshed with the driving gear 310. The second driven gear 340 may be provided on or fixedly mounted to the other side of the gear shaft 320 and rotatably meshed with the second gear unit 400. The bearing 350 may be provided between the first driven gear 330 and the second driven gear 340 on the gear shaft 320 to rotatably support the gear shaft 320.

The gear shaft 320 may be formed to extend in an axial direction, the first driven gear 330 may be provided at or fixedly coupled to one side of the gear shaft 320, and the second driven gear 340 may be integrally provided at the other side of the gear shaft 320. A rotary shaft portion of the gear shaft 320 may be disposed perpendicular to the driving shaft of the motor 200 and accommodated in the housing 100. The first driven gear 330 may be provided as, for instance, but not limited to, a helical gear to be rotatably engaged or meshed with the driving gear 310 which may be implemented as a helical gear. For instance, the first driven gear 330 may be provided on one end portion of the gear shaft 320 through injection molding or may be manufactured as a separate member and then fixed to the gear shaft 320 through riveting. The first driven gear 330 may be rotatably engaged or meshed with the driving gear 310 to primarily reduce power or force provided from the motor 200.

The second driven gear 340 may be provided on the other side of the gear shaft 320, and the second driven gear 340 may be provided as, for example, but not limited to, a worm gear integrally provided with the gear shaft 320. That is, a portion of the gear shaft 320 may be formed or provided as a worm shaft, and the worm gear 340, which is an example of the second driven gear 340, may be integrally formed with or on an outer circumferential surface of the other side of the worm shaft 320. The worm gear 340 may rotate together with the worm shaft 320 to transmit the rotational power or force to the second gear unit 400.

The second gear unit 400 is rotatably connected to the first gear unit 300 and configured to receive the rotational force transmitted from the first gear unit 300 and transmit the rotational force to the power conversion unit 500. For example, if the second driven gear 340 is provided as a worm gear, the second gear unit 400 may include a worm wheel rotatably meshed with the worm gear 340 of the first gear unit 300. Additionally or alternatively, the second driven gear 340 may include a planetary gear which reduces a rotational force of the worm wheel 400. A rotary shaft of the worm wheel of the second gear unit 400 may be disposed perpendicular to the rotary shaft of the worm shaft 320 of the first gear unit 300 and may be disposed parallel to the driving shaft of the motor 200.

Meanwhile, since a direction of a thrust applied to the worm shaft through the worm wheel when the actuator is mounted on a caliper brake provided on a left wheel of the vehicle is opposite to a direction of a thrust applied to the worm shaft through the worm wheel when the actuator is mounted on a caliper brake provided on a right wheel of the vehicle, some of components therearound including the worm shafts to which loads are applied or which are likely to be highly worn are different. Accordingly, the actuator needs to be designed individually or differently according to a position of the wheel on which the actuator is mounted or considered individually or differently according to a position of the wheel on which a component absorbing a load is mounted in order to deal with the above-described difference. In this case, a production efficiency of a product may decrease, a manufacturing cost may increase, and thus competitiveness of the product may decrease.

Accordingly, in the actuator 1 according to an embodiment of the present disclosure, the bearing 350 may be provided between the first driven gear 330 and the second driven gear 340 of the gear shaft 320 to stably absorb the load applied to the worm shaft 320 regardless of a position of a wheel on which the actuator 1 is mounted or a direction of a thrust. For example, the bearing 350 may be positioned in the middle between the helical gear 330 on one side of the worm shaft 320 and the worm gear 340 on the other side of the worm shaft 320 to absorb the load applied to the worm shaft 320 regardless of the direction of the thrust applied to the worm wheel 400. In addition, at least a part of the bearing 350 may be inserted into or accommodated in a bearing accommodation portion 150 recessed in the housing 100, which will be described below, to stably absorb the load applied to the worm shaft 320 so that one end portion and the other end portion of the bearing 350 may be provided or positioned to face and be supported by an inner surface of the bearing accommodation portion 150. In addition, a diameter of the bearing 350 may be greater than a diameter of the gear shaft 320 for stable rotation of the gear shaft 320. In this case, since the bearing 350 is provided in the middle of the gear shaft 320 instead of a side portion of the gear shaft 320, sizes and the number of protruding portions 120 protruding outward from the housing 100, which will be described below, can be minimized to suppress the expansion of a size of the housing 100, and interference with components therearound can be minimized. A detailed description thereof will be provided below.

The bearing 350 may include an outer ring 355, an inner ring 351, and a plurality of balls rotatably disposed between the outer ring 355 and the inner ring 351, and a coupling hole 352 formed in the inner ring 351 and at the center of the bearing 350 to pass through the bearing 350 in the axial direction of the shaft 320 so that the worm shaft 320 can be inserted into the coupling hole 352. An inner circumferential surface of the coupling hole 352 may be press-fitted onto an outer circumferential surface of the worm shaft 320 so that the bearing 350 is fixedly coupled to the worm shaft 320 (see FIG. 4). A detailed description thereof will be provided below.

In addition, a clip member 360 may be provided on the outer circumferential surface of the worm shaft 320 to stably support the bearing 350 so that the clip member 360 can limit the movement of the bearing 350 and prevent the bearing 350 from falling off from the worm shaft 320. The clip member 360 may be substantially ring-shaped or substantially partially ring-shaped to be elastically deformable and coupled to the outer circumferential surface of the worm shaft 320 to support one end portion of the bearing 350 on the worm shaft 320. The other end portion of the bearing 350 may be supported by a latching step or a stepped portion 322 formed on the outer circumferential surface of the worm shaft 320. To this end, the worm shaft 320 may include an expansion part or protruded portion 321 formed at the other side of a portion in contact with the bearing 350. A diameter of the expansion part 321 may be greater than an inner diameter of the coupling hole 352 of the bearing 350 or a diameter of a portion in contact with the coupling hole 352 of the bearing 350 so that the latching step 322 may be formed on one end portion of the expansion part 321 (see FIGS. 4 and 5).

Alternatively, a support ring 370 may also be provided on the outer circumferential surface of the worm shaft 320 to stably support the bearing 350. The support ring 370 may have a ring or cylinder shape and may be injection-molded between the other end portion of the helical gear 330 and one end portion of the bearing 350 to support one end portion of the bearing 350 on the worm shaft 320. The support ring 370 may be integrally formed in a single piece by, for example, not limited to, being injection-molded with the helical gear 330, and thus a manufacturing process and a structure of the product can be simplified. The other end portion of the bearing 350 may be supported by the latching step 322 formed on the outer circumferential surface of the worm shaft 320, and the latching step 322 may be formed on one end portion of the expansion part 321 which is provided on the worm shaft 320 to be greater than an inner diameter of the expansion part 321 or the diameter of the portion in contact with the coupling hole 352 (see FIG. 10).

The housing 100 is provided for the motor 200 so that the motor 200 can be mounted in or supported by the housing 100 and the gear assembly can be accommodated in the housing 100. The housing 100 is formed such that the inside of the housing 100 is an empty space so that the motor 200 and a plurality of gears of the gear assembly can be accommodated in and supported by the housing 100. In addition, in FIGS. 1 and 3, an upper surface of the housing 100 is formed to be open so that the motor 200 and the plurality of gears may be inserted into an installation space of the housing 100 during the assembly of the actuator, a cover may be coupled to or mounted on the upper surface or open side of the housing 100 to seal the installation space from the outside of the housing 100, and a connector 180 electrically connected to a power supply or electronic control unit may be provided on one side of the housing 100 or the cover of the housing 100.

The bearing accommodation portion 150 in which at least a portion of the bearing 350 is inserted and accommodated may be formed in the housing 100, and the bearing accommodation portion 150 may be formed to face and support one end portion and the other end portion of the bearing 350 to surround the one end portion and the other end portion of the bearing 350. As both end portions of the bearing 350 are supportably accommodated in the bearing accommodation portion 150 formed in the housing 100, the bearing 350 may stably absorb loads applied to the worm shaft 320 in both directions.

Meanwhile, in a housing of the conventional actuator, as a plurality of gear elements are asymmetrically disposed, an external shape of the housing is asymmetrical, and even when the housing is mounted on or to a supportable structure such as a caliper brake or vehicle body, the housing is asymmetrically installed. Accordingly, when the housing of the conventional actuator is installed on each of a left wheel and a right wheel, mounting directions are different, and thus interference between components therearound occurs or the like, and the mountability and applicability to a vehicle are degraded. When the housing of the actuator is individually or differently designed and manufactured according to a position of the wheel on which the housing of the actuator is mounted in order to overcome this degradation, production efficiency of a product may decrease and a manufacturing cost may increase.

Accordingly, the housing 100 of the actuator 1 according to an embodiment of the present disclosure may include at least one pair of mounting parts 110 formed to protrude from an outer surface of the housing 100 to be mounted to or on a supportable structure or fixture of the vehicle such as a caliper brake or vehicle body using fastening members such as bolts or screws, and the pair of mounting parts 110 are symmetrically disposed on the outer surface of the housing 100.

Specifically, the mounting parts 110 may be formed to protrude outward from the outer surface of the housing 100, and fastening holes 111 through which the fastening members such as bolts or screws pass may be formed to pass through the mounting parts 110. At least one pair of mounting parts 110 are provided on the outer surface of the housing 100, and at least one pair of mounting parts 110 may be provided symmetrically with respect to a central line C of the housing 100.

The central line C of the housing 100 may be defined as a central extension line of a short side of the housing 100 (e.g. a line in a vertical direction of the housing 100 in FIGS. 1 and 3) or a central extension line of a long side of the housing 100 (e.g. a line in a left-right direction of the housing 100 in FIGS. 1 and 3). Hereinafter, an exemplary embodiment of the present disclosure will be described based on the central line C on the short side of the housing 100, however, the central line of the long side of the housing 100 may also be understood in the same manner.

As described above, by at least one pair of mounting parts 110 being provided or arranged symmetrically with respect to the central line C of the housing 100, the actuator 1 may be mounted to and installed on the vehicle body in the same direction regardless of the position of the wheel on which the actuator 1 is mounted. Accordingly, the mountability and applicability of the product to the vehicle can be improved regardless of the position of the wheel on which the actuator 1 is mounted, and the design of components therearound of the housing 100 of the actuator 1 can be performed more easily.

One or more protruding portions 120 which protrude outward due to the arrangement of the gear assembly, such as the worm shaft 320, accommodated inside the housing 100, may be provided on the housing 100. The protruding portions 120 are formed on the housing 100 because the housing 100 accommodates the plurality of gears therein and expansion of the size of the housing 100 is suppressed, and thus the protruding portions 120 of the housing 100 may interfere with components therearound and the degrade applicability of the product and the space utilization of the vehicle body. Accordingly, in the housing 100 of the actuator 1 according to an embodiment of the present disclosure, outer ends 120a of the protruding portions 120 formed to protrude outward may be positioned further inward toward the housing 100 than outer ends 110a of the pair of mounting parts 110 as illustrated in FIG. 2. Specifically, the outer ends 120a of the protruding portions 120 of the housing 100 may be located to be closer to the central line C than the outer ends 110a of the mounting parts 110. Since the mounting parts 110 are essential structures required to install the actuator 1 to the vehicle and support the actuator 1, the outer ends 120a of the protruding portions 120, which protrude due to one or more components disposed inside of the housing such as the worm shaft 320 and the like, are less protruded and positioned further inward toward the housing 100 than the outer ends 110a of the mounting parts 110 to minimize interference with components around the housing 100. In addition, as described above, since the bearing 350 is provided in the central portion or middle of the worm shaft 320, the sizes and the number of protruding portions 120 of the housing 100 can be reduced or minimized, and thus the interference with the components around the housing 100 can be more effectively reduced or prevented.

Hereinafter, a method of manufacturing the actuator 1 according to an embodiment of the present disclosure will be described.

FIGS. 4 to 7 are perspective views for sequentially illustrating a method of manufacturing an actuator according to an embodiment of the present disclosure.

Referring to FIGS. 4 to 7, a method of manufacturing an actuator 1 according to an embodiment of the present disclosure may include providing a motor 200, installing or positioning the motor 200 in a housing 100, and installing a gear assembly, configured to transmit a driving force of the motor 200, in the housing 100. The operation of the installation of the gear assembly includes providing a worm shaft 320, providing a driving gear 310 on a driving shaft of the motor 200, providing a helical gear 330 rotatably meshed with the driving gear 310 on one side of the worm shaft 320, providing a worm gear 340 on the other side of the worm shaft 320, and providing a bearing 350 on the worm shaft 320.

Figure 4:
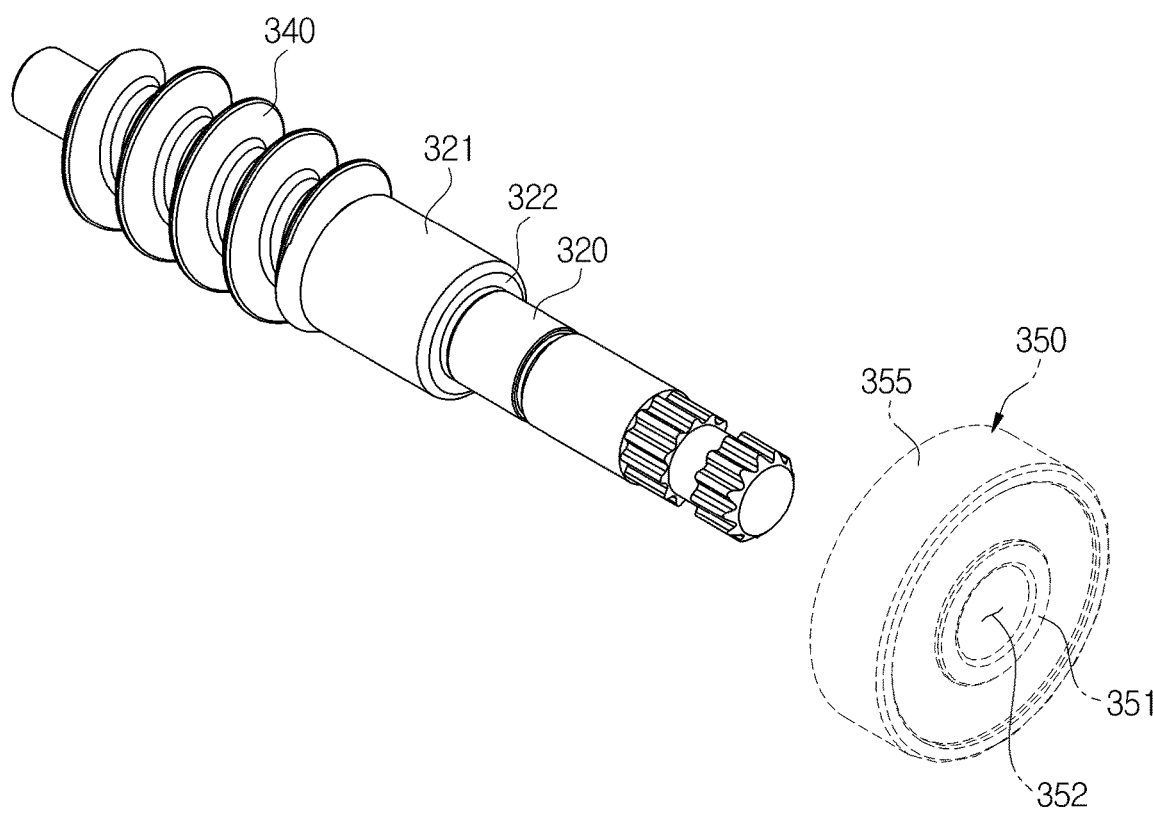
FIGS. 4 to 7 are perspective views for sequentially illustrating a method of manufacturing an actuator according to an embodiment of the present disclosure.

The worm shaft 320 may be formed to extend in an axial direction, the helical gear 330, which will be described below, is provided on one side of the worm shaft 320, and the worm gear 340 is provided on the other side of the worm shaft 320. The worm gear 340 may be integrally provided with or formed on the worm shaft 320, and an expansion part 321 having a diameter greater than a diameter of a portion of the worm shaft 320 to which the bearing 350 is coupled may be provided on one side of the worm gear 340 or adjacent to the worm gear 340 to form a latching step or stepped portion 322 which supports the other end portion of the bearing 350 as shown in FIG. 4.

Figure 5:
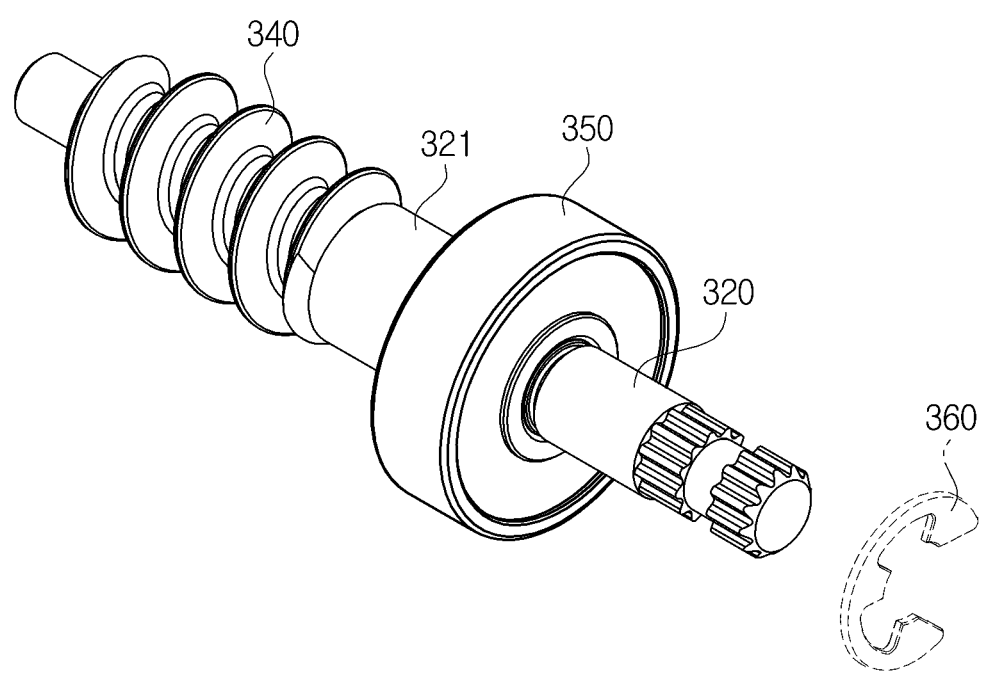

Then, the bearing 350 is press-fitted onto the worm shaft 320. Specifically, the bearing 350 may be fixedly coupled to the worm shaft 320 by, for example, but not limited to, press-fitting an inner circumferential surface of a coupling hole 352, which is formed to pass through an inner ring 351 of the bearing 350 in the axial direction of the bearing 350, onto an outer circumferential surface of the bearing 350 as shown in FIG. 5. The other end portion of the bearing 350 is supported by the latching step 322 of the worm shaft 320.

Figure 6:
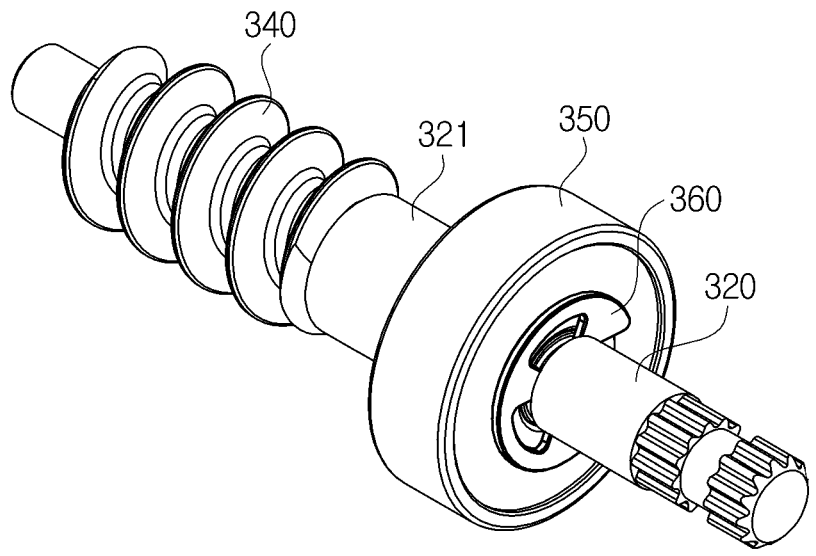

After the bearing 350 is press-fitted onto the worm shaft 320, a clip member 360 is installed or disposed on one side of the bearing 350 to stably fix the bearing 350 or support one side of the bearing 350 in order for the bearing 350 not to fall out from the worm shaft 320. The bearing 350 may be stably coupled to and maintained or placed on the worm shaft 320 in position and may be prevented from being separated from the worm shaft 320 by fastening the clip member 360, which has a ring shape or a partial ring shape with elasticity, to one end portion of the bearing 350 on the worm shaft 320 as shown in FIG. 6.

Figure 7:
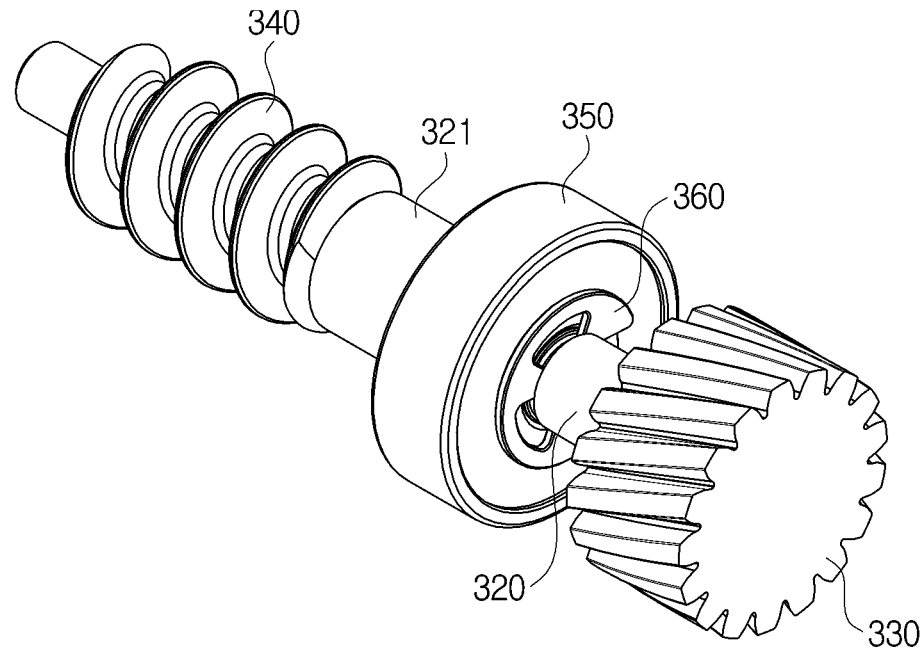

After the bearing 350 and the clip member 360 are installed or disposed on the worm shaft 320, the helical gear 330 is provided on one side of the worm shaft 320. As illustrated in FIG. 7, the helical gear 330 may be provided on one side of the worm shaft 320 through, for example, but not limited to, injection molding, specifically, overmolding, and thus a manufacturing process of the gear assembly can be simplified, and the product can be lighter.

Hereinafter, a method of manufacturing the actuator 1 according to another embodiment of the present disclosure will be described.

Figure 8:
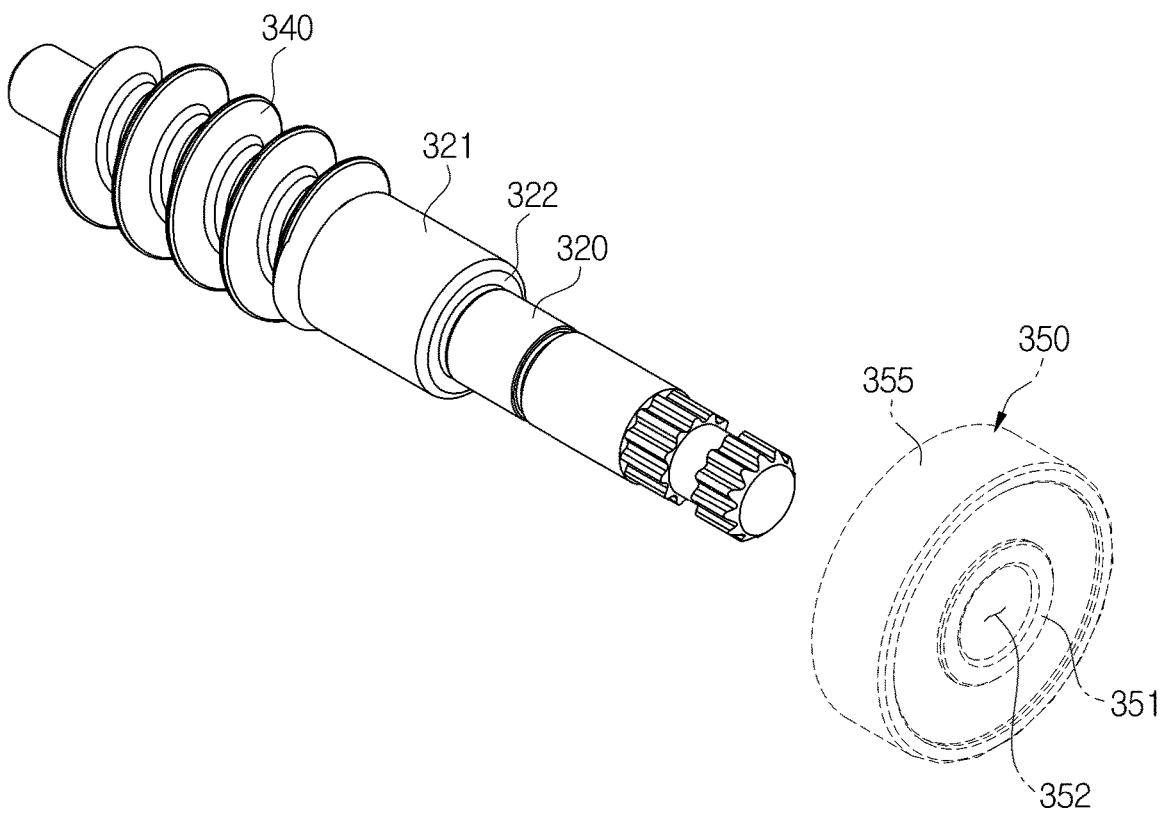
FIGS. 8 to 10 are perspective views for sequentially illustrating a method of manufacturing an actuator according to another embodiment of the present disclosure.
Figure 9:
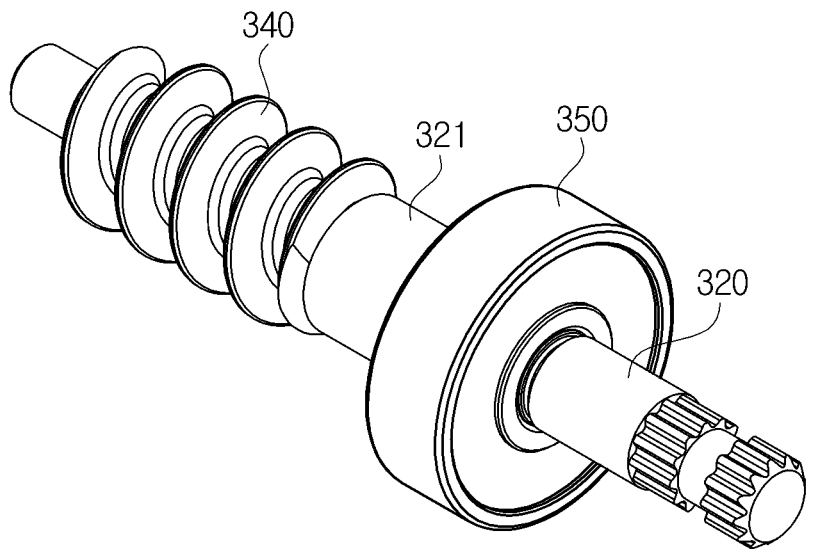
Figure 10:
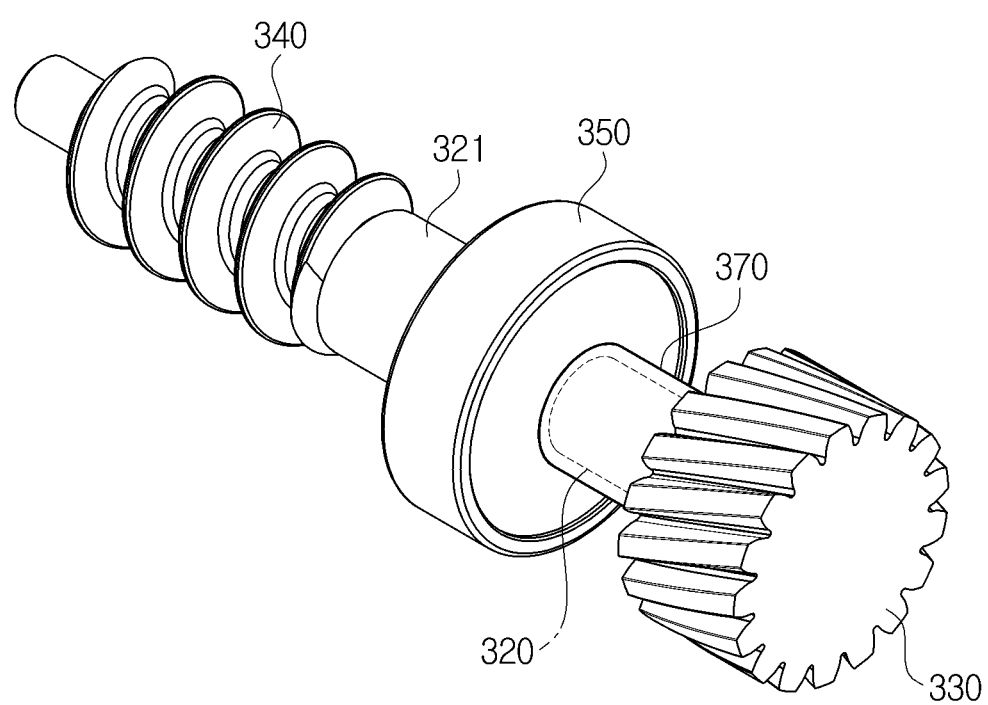

FIGS. 8 to 10 are perspective views for sequentially illustrating a method of manufacturing an actuator according to another embodiment of the present disclosure.

Referring to FIGS. 8 to 10, a method of manufacturing an actuator 1 according to one embodiment of the present disclosure may include providing a motor 200, installing or positioning the motor 200 in a housing 100, and providing a gear assembly, configured to transmit a driving force of the motor 200, in the housing 100, the operation of the installation of the gear assembly includes providing a worm shaft 320, providing a driving gear 310 on a driving shaft of the motor 200, providing a helical gear 330 rotatably meshed with the driving gear 310 on one side of the worm shaft 320, providing a worm gear 340 on the other side of the worm shaft 320, and providing a bearing 350 on the worm shaft 320.

The worm shaft 320 may be formed to extend in an axial direction, the helical gear 330, which will be described below, is provided on one side of the worm shaft 320, and the worm gear 340 is provided on the other side of the worm shaft 320. The worm gear 340 may be integrally provided with or formed on the worm shaft 320, and an expansion part 321 having a diameter greater than a diameter of a portion of the worm shaft 320 to which the bearing 350 is coupled may be provided on one side of the worm gear 340 or adjacent to the worm shaft 340 to form a latching step or stepped portion 322 which supports the other end portion of the bearing 350 as shown in FIG. 8.

Then, the bearing 350 is press-fitted onto the worm shaft 320. Specifically, the bearing 350 may be fixedly coupled to the worm shaft 320 by, for instance, but not limited to, press-fitting an inner circumferential surface of a coupling hole 352, which is formed to pass through an inner ring 351 of the bearing 350 in the axial direction of the bearing 350, onto an outer circumferential surface of the bearing 350 as shown in FIG. 9. The other end portion of the bearing 350 is supported by the latching step 322 of the worm shaft 320.

After the bearing 350 is press-fitted onto the worm shaft 320, the helical gear 330 is provided or disposed on one side of the worm shaft 320, and at the same time, a support ring 370 is provided or disposed on one side of the bearing 350 to stably fix the bearing 350 or support one side of the bearing 350 in order for the bearing 350 not to fall out from the worm shaft 320. The helical gear 330 and the support ring 370 may be provided together simultaneously on one side of the bearing 350 on the worm shaft 320 through, for instance, but not limited to, injection molding, specifically overmolding, and thus a manufacturing process of the gear assembly can be simplified, and a product can be lighter. In addition, the support ring 370 may be provided on the worm shaft 320 between one end portion of the bearing 350 and the helical gear 330 to stably couple the bearing 350 to the worm shaft 320 and maintain or support the bearing 350 on the worm shaft 320 and prevent the separation of the bearing 350 from the worm shaft 320 as shown in FIG. 10.

Hereinafter, a method of manufacturing the actuator 1 according to still another embodiment of the present disclosure will be described.

Figure 11:
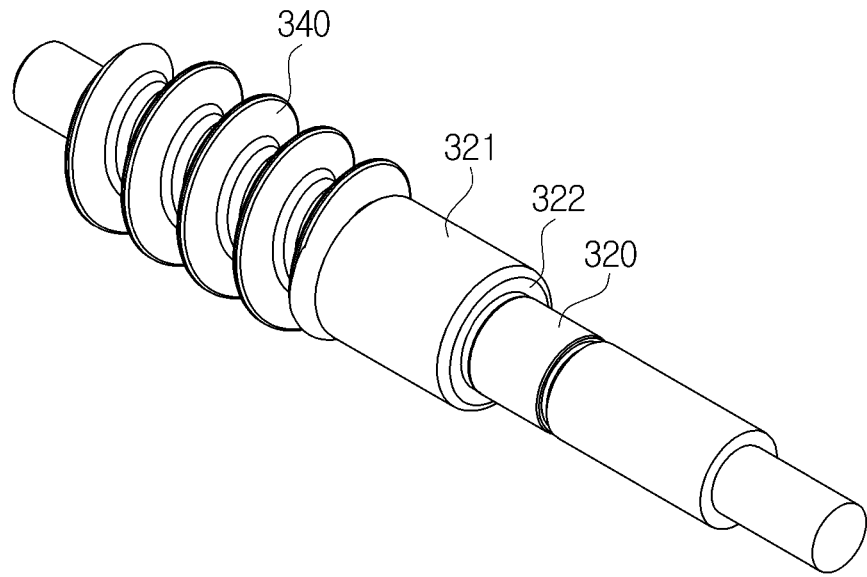
FIGS. 11 to 13 are perspective views for sequentially illustrating a method of manufacturing an actuator according to still another embodiment of the present disclosure.
Figure 12:
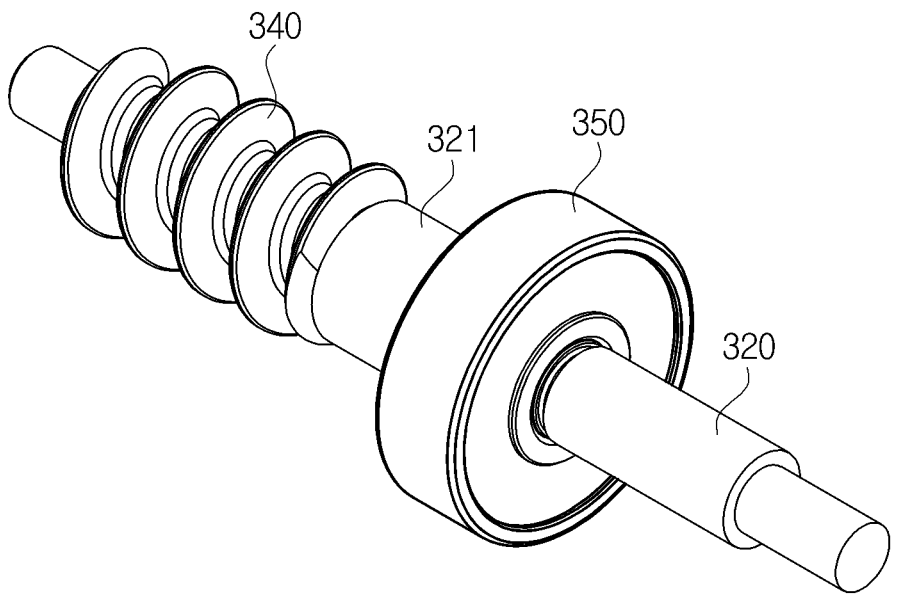
Figure 13:
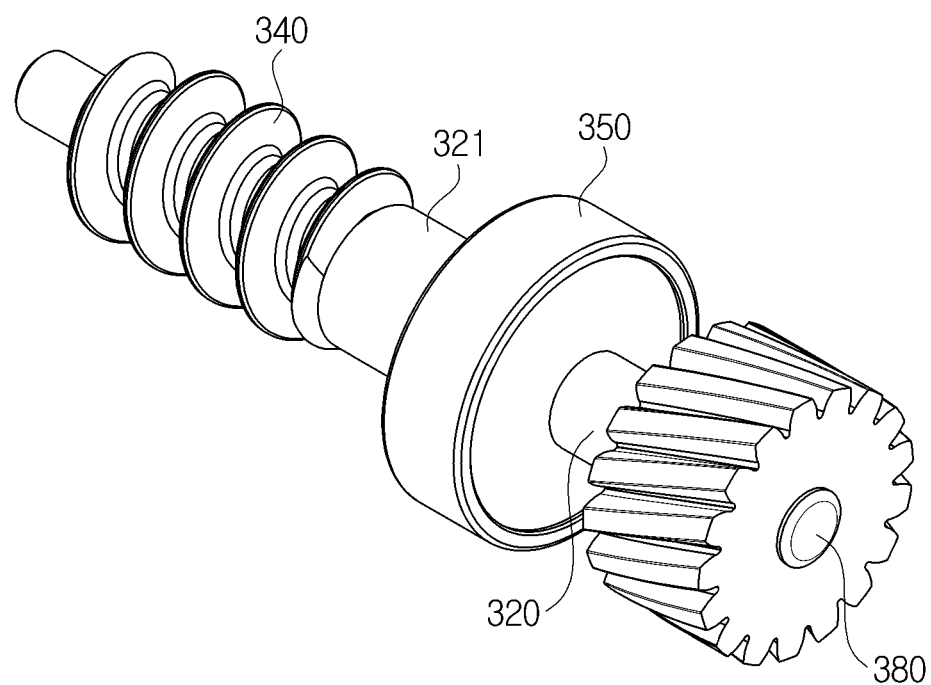

FIGS. 11 to 13 are perspective views for sequentially illustrating a method of manufacturing an actuator according to still another embodiment of the present disclosure.

Referring to FIGS. 11 to 13, a method of manufacturing an actuator 1 according to one embodiment of the present disclosure may include providing a motor 200, installing or positioning the motor 200 in a housing 100, and providing a gear assembly, configured to transmit a driving force of the motor 200, in the housing 100. The providing of the gear assembly may include providing a worm shaft 320, providing a driving gear 310 on a driving shaft of the motor 200, providing a helical gear 330 rotatably meshed with the driving gear 310 on one side of the worm shaft 320, providing a worm gear 340 on the other side of the worm shaft 320, and providing a bearing 350 on the worm shaft 320.

The worm shaft 320 may be formed to extend in an axial direction, and the helical gear 330, which will be described below, is provided on one side of the worm shaft 320, and the worm gear 340 is provided on the other side of the worm shaft 320. The worm gear 340 may be integrally provided with or formed on the worm shaft 320, and an expansion part 321 having a diameter greater than a diameter of a portion of the worm shaft to which the bearing 350 is coupled may be formed on one side of the worm gear 340 or adjacent to the worm gear 340 to form a latching step or stepped portion 322 which supports the other end portion of the bearing 350 as shown in FIG. 11.

Then, the bearing 350 is press-fitted onto the worm shaft 320. Specifically, the bearing 350 may be fixedly coupled to the worm shaft 320 by, for example, but not limited to, press-fitting an inner circumferential surface of the coupling hole 352, which is formed to pass through an inner ring 351 of the bearing 350 in the axial direction of the bearing 350, onto an outer circumferential surface of the bearing 350 as shown in FIG. 12. The other end portion of the bearing 350 is supported by the latching step 322 of the worm shaft 320.

After the bearing 350 is press-fitted onto the worm shaft 320, the helical gear 330 is provided or disposed on one side of the worm shaft 320. The helical gear 330 may be manufactured separately as a separate part from the worm shaft 320 and then bonded to one end portion of the worm shaft 320 using, for example, but not limited to, a rivet 380 so that the helical gear 330 may be stably fixedly coupled to one side of the worm shaft 320 as illustrated in FIG. 13. To this end, a hole for the rivet 380 may be formed on one side of the worm shaft 320 in the axial direction through punching or drilling, and after the helical gear 330 is mounted on one end of the worm shaft 320, the rivet 380 may be inserted into the hole for the rivet 380 and then pressed to fix the helical gear 330.

According to an actuator and a method of manufacturing the same according to some embodiments of the present disclosure, the mountability and applicability can be improved.

According to an actuator and a method of manufacturing the same according to certain embodiments of the present disclosure, the space utilization of a vehicle body can be improved.

According to an actuator and a method of manufacturing the same according to various embodiments of the present disclosure, the durability and operating performance of a product can be improved.

According to an actuator and a method of manufacturing the same according to some embodiments of the present disclosure, the actuator can stably generate braking power regardless of a position of a wheel to which the actuator is mounted.

According to an actuator and a method of manufacturing the same according to certain embodiments of the present disclosure, a structure and a shape of a product can be simplified to improve the assemblability and productivity of the actuator.

According to an actuator and a method of manufacturing the same according to various embodiments of the present disclosure, a design of the actuator can be simplified, and a manufacturing cost of the actuator can be reduced.

What is claimed is:

1. An actuator comprising:

a motor configured to generate a rotational force;

a gear assembly configured to transmit the rotational force of the motor; and a housing accommodating the gear assembly therein, wherein:

the gear assembly includes a driving gear provided on a driving shaft of the motor, a first gear unit rotatably connected with the driving gear, and a second gear unit rotatably connected with the first gear unit to transmit the rotational force transmitted from the first gear unit, the first gear unit includes a gear shaft, a first driven gear provided on one portion of the gear shaft and rotatably coupled with the driving gear provided on the driving shaft of the motor, a second driven gear provided on an other portion of the gear shaft and rotatably coupled with the second gear unit, the actuator further comprises a bearing positioned on the gear shaft of the first gear between the first driven gear and the second driven gear, and a support member coupled to an outer circumferential surface of the gear shaft of the first gear unit to support the bearing positioned between the first driven gear and the second driven gear, and wherein the bearing is press-fitted onto the gear shaft of the first gear unit.

2. The actuator of claim 1, wherein the housing includes a bearing accommodation portion supporting one end portion and an other end portion of the bearing positioned between the first driven gear and the second driven gear.

3. The actuator of claim 1, wherein:

the housing includes at least one pair of mounting parts protruding from an outer surface of the housing and fixed to a structure of a vehicle; and the pair of mounting parts are positioned symmetrically with respect to the second gear unit.

4. The actuator of claim 3, wherein:

at least one protruding portion of the housing protruding outward accommodates at least a part of the first gear unit therein; and an outer end of at least one of the pair of mounting parts fixed to the structure of the vehicle is located further outward than an outer end of the protruding portion accommodating the at least a part of the first gear unit.

5. The actuator of claim 1, wherein the gear shaft of the first gear unit is fixedly inserted in a coupling hole of an inner ring of the bearing.

6. The actuator of claim 5, wherein the support member is a clip member.

7. The actuator of claim 5, wherein the first driven gear is a helical gear molded on the gear shaft.

8. The actuator of claim 7, wherein the support member is a support ring provided on the gear shaft between the helical gear and the bearing to support the bearing.

9. The actuator of claim 8, wherein one end portion of the bearing is supported by the support ring provided on the gear shaft and an other end portion of the bearing is supported by a latching step formed on the gear shaft.

10. The actuator of claim 5, wherein the first driven gear is a helical gear coupled on the gear shaft by a rivet.

11. The actuator of claim 1, wherein the second driven gear is a worm gear integrally formed on the gear shaft.

12. The actuator of claim 11, wherein the second gear unit includes a worm wheel rotatably meshed with the worm gear.

13. The actuator of claim 1, wherein the housing includes:

at least one pair of mounting parts protruding from an outer surface of the housing and fixed to a structure of a vehicle; and at least one protruding portion protruding outward to accommodate at least a part of the gear assembly therein, and wherein an outer end of at least one of the pair of mounting parts fixed to the structure of the vehicle is located further outward than an outer end of the at least one protruding portion accommodating the at least a part of the first gear unit.

14. The actuator of claim 13, wherein the pair of mounting parts are provided symmetrically with respect to the second gear unit.

15. A method of manufacturing an actuator, the method comprising:

providing a motor configured to generate a rotational force; and providing a gear assembly, configured to transmit the rotational force of the motor, into a housing, wherein:

the providing of the gear assembly includes providing a driving gear on a driving shaft of the motor, providing a helical gear rotatably coupled with the driving gear on one portion of a worm shaft, providing a worm gear on an other portion of the worm shaft, and providing a bearing on the worm shaft, and the providing of the bearing includes press-fitting the bearing onto an outer circumferential surface of the worm shaft between the helical gear and the worm gear, the method further comprises providing a clip member on the worm shaft to support the bearing after the press-fitting of the bearing onto the worm shaft.

16. The method of claim 15, wherein the providing of the helical gear includes injection-molding the helical gear on the worm shaft after the press-fitting of the bearing onto the worm shaft.

17. The method of claim 16, wherein the injection-molding of the helical gear comprises injection-molding the helical gear with a support ring on the worm shaft between the helical gear and the bearing.

18. The method of claim 15, wherein the providing of the helical gear includes fixedly riveting the helical gear to the worm shaft after the press-fitting of the bearing onto the worm shaft.

19. The method of claim 15, wherein the worm gear provided in the providing of the worm gear is integrated with the worm shaft.

* * * * *